Figure 5:
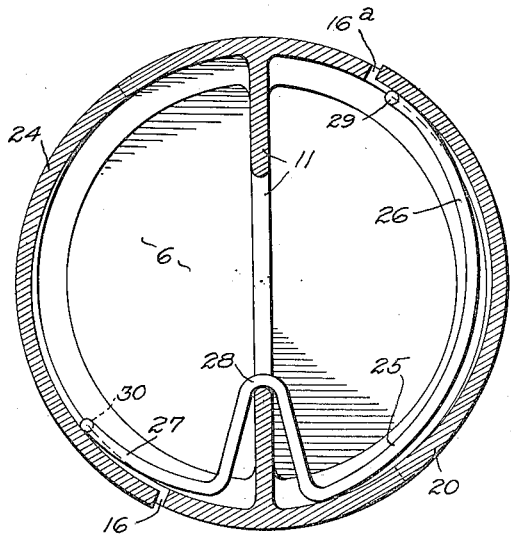

Aug. 11, 1925.
J. A. HUGHES
1,548,885
PISTON
Filed March 21, 1925      2 Sheets-Sheet 1
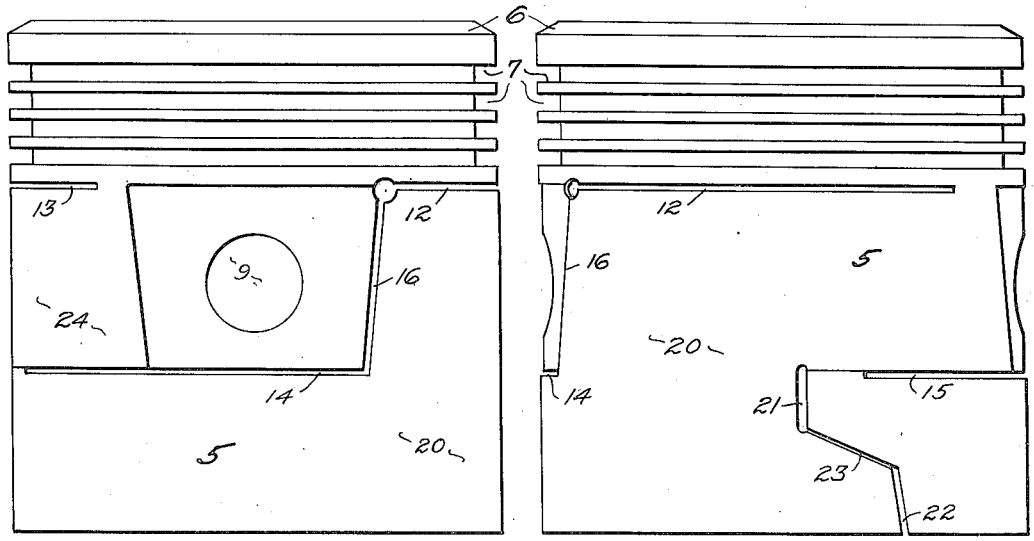
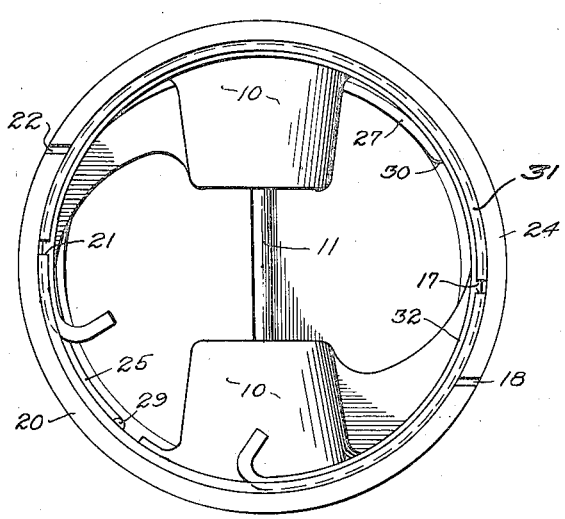
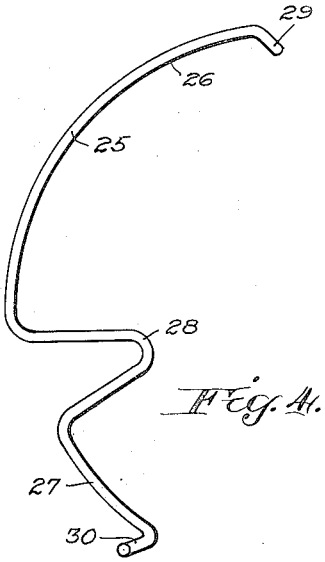
Inventor
James A. Hughes
By F. A. Witherspoon
Attorney Inventor
James A. Hughes
By F. A. Witherspoon
Attorney Patented Aug. 11, 1925.

1,548,885

UNITED STATES PATENT OFFICE.

JAMES A. HUGHES, OF BALTIMORE, MARYLAND.

PISTON.

Application filed March 21, 1925. Serial No. 17,331.

*To all whom it may concern:*

Be it known that I, JAMES A. HUGHES, a citizen of the United States, residing at Baltimore city, State of Maryland, have invented certain new and useful Improvements in Pistons; and I do hereby declare the following to be a full, clear, and exact description of the invention, such as will enable others skilled in the art to which it appertains to make and use the same.

The present invention relates to certain new and useful improvements in pistons and particularly to that type of piston described in the William Thomas Bowers Patent No. 1,437,490, and assigned to the Master Piston Corporation of Baltimore, Maryland, and recorded in the Transfer of Patents, U. S. Patent Office, June 13, 1924, Liber G-122, page 5.

The object of the present invention is to provide a piston with a pair of circumferentially extending resilient sections, but without necessarily subjecting the wrist pin holes to this expansion.

A further object of the invention is to provide a piston with a radially or horizontally slotted skirt portion and positive expanding means, which permits the resilient skirt portion to be expanded or contracted to overcome irregular conditions when a piston is fitted in a cylinder.

A further object of this invention is to provide a piston with a resilient skirt slotted horizontally at diametrically opposite points and movable circumferentially in the plane of one another, and positive expanding means to permit the slotted portions to be contracted or expanded to meet different conditions.

A still further object of the invention is the provision of a piston having its skirt portion slotted radially or horizontally at diametrically opposite points, approximately 270°, to provide a pair of diametrically opposed, interfitted, resilient sections, and springs interiorly arranged in said skirt portion to positively expand said sections beyond the plane of the head thereof.

With these and other objects in view, the invention consists in certain novel features, combination and arrangement of parts as will be hereinafter more fully described, pointed out in the drawings, and claimed.

Figure 6:
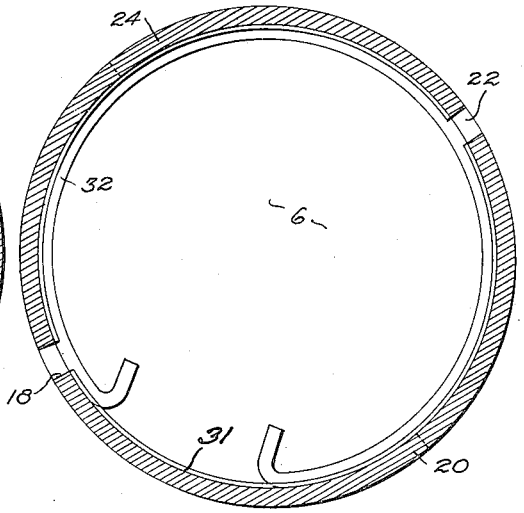
Figure 7:
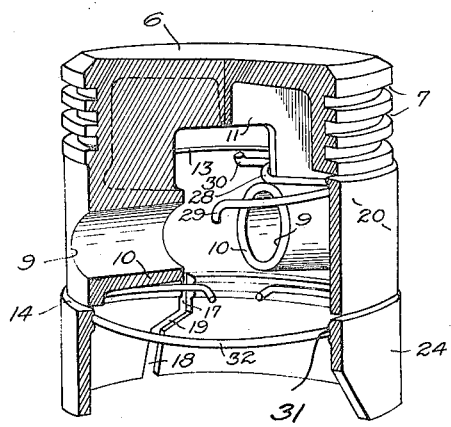

In the drawings,

Figure 1 is a side elevation of my improved piston, as made in accordance with this invention, and showing the lower radially or horizontally extending slot, Figure 2 is a side elevational view of my improved piston, showing the upper horizontally or radially extending slot, Figure 3 is a bottom plan view illustrating the interior of the piston, showing the expansion springs in proper position, Figure 4 is a perspective view of the upper expanding spring, Figure 5 is a transverse sectional view, illustrating the top expansion spring in active expanding position, Figure 6 is a transverse sectional view, illustrating the bottom expansion spring in active expanding position, and, Figure 7 is a perspective view, partly in section, illustrating a piston as made and assembled, in accordance with this invention.

Referring to the drawings, the piston is designated in its entirety by the numeral 5, and it comprises in its construction the usual head 6 having formed therein the ring-carrying groove 7, and this head 6 has casted integral therewith, the usual skirt portion, which is provided at diametrically opposite points with wrist pin holes 9, which extend through the usual wrist pin bosses 10.

To reinforce the head 6 and wrist pin bosses 10, I form on the interior thereof, a strengthening rib or reinforcing member 11, which member is formed integral with the upper sides of the bosses 10, and the inner face of the head 6.

The construction just described is the common construction of a piston, and it is to this type of piston that my present invention applies. To form my piston, the casting previously described, is provided at diametrically opposite points at the point of juncture of the skirt with the head, with horizontally or radially extending slots 12 and 13, respectively, and the slots 12 and 13, respectively, extend for approximately 120° about the circumference of the piston in opposite directions from the wrist pin boss-carrying portions.

The skirt of the piston is provided adjacent its lower end at diametrically opposite points with a pair of horizontally or radially extending slots 14 and 15, respectively, and these slots extend for approximately 150° of the circumference of the piston, and it will be readily understood that a portion of the slot 15 underlies a portion of the slot 12, while a portion of the slot 14 extends and is directly under the slot 13.

To connect the slot 12 with the slot 13, I provide a slot 16, which is arranged on approximately a 11° angle taken from the vertical, and this slot 16 is arranged on one side of one of the wrist pin boss-carrying portions.

To connect the slot 13 with the slot 15, I provide a substantially vertical slot 16ª, which is taken on a 11° angle from a vertical line. This slot 16ª is arranged on one side of the other wrist pin boss-carrying portion and is at a point diametrically opposite from the slot 16.

The slot 14 terminates in a vertical slot 17, which communicates with an inclined slot 18, by virtue of a slot 19, and the slot 18 opens out through the lower edge of the skirt and provides one free resilient section 20, and the slot 15 terminates into a vertical slot 21, which is connected to an inclined slot 22 by a secondary inclined slot 23, and the slot 22 opens out through the bottom edge of the skirt, providing a second resilient section 24.

When the skirt is slotted in the manner previously described, it provides a pair of diametrically opposed circumferentially extending resilient sections 20 and 24, respectively, and the flexibility of these sections, due to the arrangement of the slots, permits the skirt portions to be readily expanded by internal springs radially and circumferentially. It also permits the diameter of the skirt portions to be changed by contraction due to the radial circumferential expansion of one section in the direction of the other section. This is accomplished when an exterior pressure is applied to the outer surfaces of the skirt portion. The flexibility of these skirt portions permits the piston to move over circumferential, irregular surfaces, due to the expansion and contraction action of the portions 20 and 24, respectively.

To provide a positive means for expanding the upper portion of the sections 20 and 24, respectively, I provide a spring 25, and this spring is provided with a long arm 26 and a short arm 27, which arms are connected together by a substantially V-shaped portion 28. The arms 26 and 27 are curved to fit the configuration of the interior of the skirt and the V-shaped portion embraces the reinforcing rib 11 and rests upon the upper side of one of the wrist pin hole bosses 10, as clearly shown in Figure 7 of the drawings.

The terminals of the arms 26 and 27, are bent downwardly and upwardly, as at 29 and 30, respectively, to provide anchoring means to engage the interior of the sections 20 and 24, respectively, to normally force them outwardly and at the same time retain said springs against accidental displacement.

The bottom portion of the skirt slightly below the slots 14 and 15, respectively, is provided on its interior with a circumferentially extending groove 31, in which is fitted a removable circular expanding spring 32, and this spring normally tends to expand the sections 20 and 24, respectively, defined by the slots 12, 13, 14, 15, 16, and 16ª, outwardly, radially.

The short arm 27 of the spring 25 is shown in Figure 7 engaging the portion 24 of the skirt, so that when the piston is connected to the connecting rod of an engine and placed in a cylinder the surface 24 will be on the valve side of the engine, or that side upon which the heaviest thrust is made when the engine is in operation.

The principal operation and purpose of this piston is described in the Bowers Patent No. 1,437,490, of which I am sole owner, but it was found in practice and manufacturing that to spirally slot a piston, as described in this patent, was a costly operation, and to overcome this serious objection the following application has been made. It has also been found that providing the skirt with horizontally extending slots, it materially reduces the cost of manufacturing and provides a piston having flexible sections capable of a free circumferential radial movable surface, when the same is placed in a cylinder of an internal combustion engine.

The flexibility of these sections permits the piston to have a tight fit with the inner surface of a cylinder, thereby preventing any wobbling of the piston as a whole, due to wear, after the same has been properly fitted in the cylinder.

Having thus described my invention, what I claim as new is:

1. A piston construction comprising a head, a skirt formed on said head, said skirt provided with diametrically opposed circumferentially extending slots as well as substantially longitudinally extending slots connected thereto, said slots forming a pair of resilient sections, and internal springs for expanding said sections.

2. A piston construction comprising a head, a skirt formed on said head, said skirt provided with a pair of diametrically opposed circumferentially extending radial slots as well as substantially longitudinally extending slots connected thereto, said slots defining a pair of resilient sections, and internal springs mounted in said skirt for expanding said sections.

3. A piston construction comprising a head, a skirt formed on said head, said skirt provided with a pair of horizontal, circumferential, diametrically opposed slots, each extending more than 120° around said piston, said skirt also provided with a second pair of diametrically opposed, horizontally extending slots extending more than 150° about the circumference of said piston, said skirt also provided with approximately vertical slots connecting each of said 120° and 150° slots, said skirt further provided with substantially longitudinal slots extending from each of said second pair of slots to the bottom of said skirt, so as to provide a pair of resilient sections, and springs arranged on the interior of said skirt to expand said sections.

4. A piston comprising a head, a skirt provided with wrist pin bosses and integrally attached to said head, said skirt provided with slits stepped around said wrist pin bosses forming a pair of resilient sections each of which extends beyond the other, and springs for expanding said sections.

5. A piston comprising a head, a skirt provided with wrist pin bosses and integrally attached to said head, said skirt provided with diametrically opposed angular slits stepped around said wrist pin bosses forming a pair of resilient sections each of which extends beyond the other, and springs for expanding said sections.

6. A piston comprising a head, a skirt integrally attached thereto and provided with slits, each slit having a plurality of circumferential and longitudinal sections, said slits forming a pair of circumferentially extending resilient sections each of which extends beyond the other, and springs for expanding said sections.

7. A piston comprising a head, a skirt integrally attached thereto and provided with two slots therein, each slot having a plurality of longitudinally and circumferentially extending sections parallel to the respective sections of the other slot, said slots forming a pair of resilient skirt sections each of which extends beyond the other, and springs for expanding said sections.

8. A piston comprising a head, a skirt integrally attached thereto and provided with two slots therein, each slot having a plurality of longitudinally and circumferentially extending sections diametrically opposed and parallel to the respective sections of the other slot, said slots forming a pair of circumferentially extending resilient skirt sections each of which extends beyond the other, and springs for expanding said sections.

In testimony whereof I affix my signature.

JAMES A. HUGHES.